United States Patent [19]

Smith

[11] 4,309,741
[45] Jan. 5, 1982

[54] FLASHER

[76] Inventor: Sidney M. Smith, 3711 Lido Way, Santa Barbara, Calif. 93105

[21] Appl. No.: 969,830

[22] Filed: Jan. 25, 1979

[51] Int. Cl.³ .............................................. F21V 33/00
[52] U.S. Cl. .................................... 362/72; 362/184; 362/186; 362/191; 362/800
[58] Field of Search ................. 362/72, 184, 186, 191, 362/800

[56] References Cited

U.S. PATENT DOCUMENTS

| | | | |
|---|---|---|---|
| 4,011,443 | 3/1977 | Smith | 362/72 |
| 4,023,032 | 5/1977 | Taylor et al. | 362/72 |
| 4,049,959 | 9/1977 | Ledterman | 362/72 |
| 4,051,361 | 9/1977 | Lichon et al. | 362/72 |

Primary Examiner—Stephen J. Lechert, Jr.

[57] ABSTRACT

The present invention relates to a bicycle light having a pair of lamps in a fresnel-lensed housing. The lamps are battery powered and provide a flashing light.

4 Claims, 8 Drawing Figures

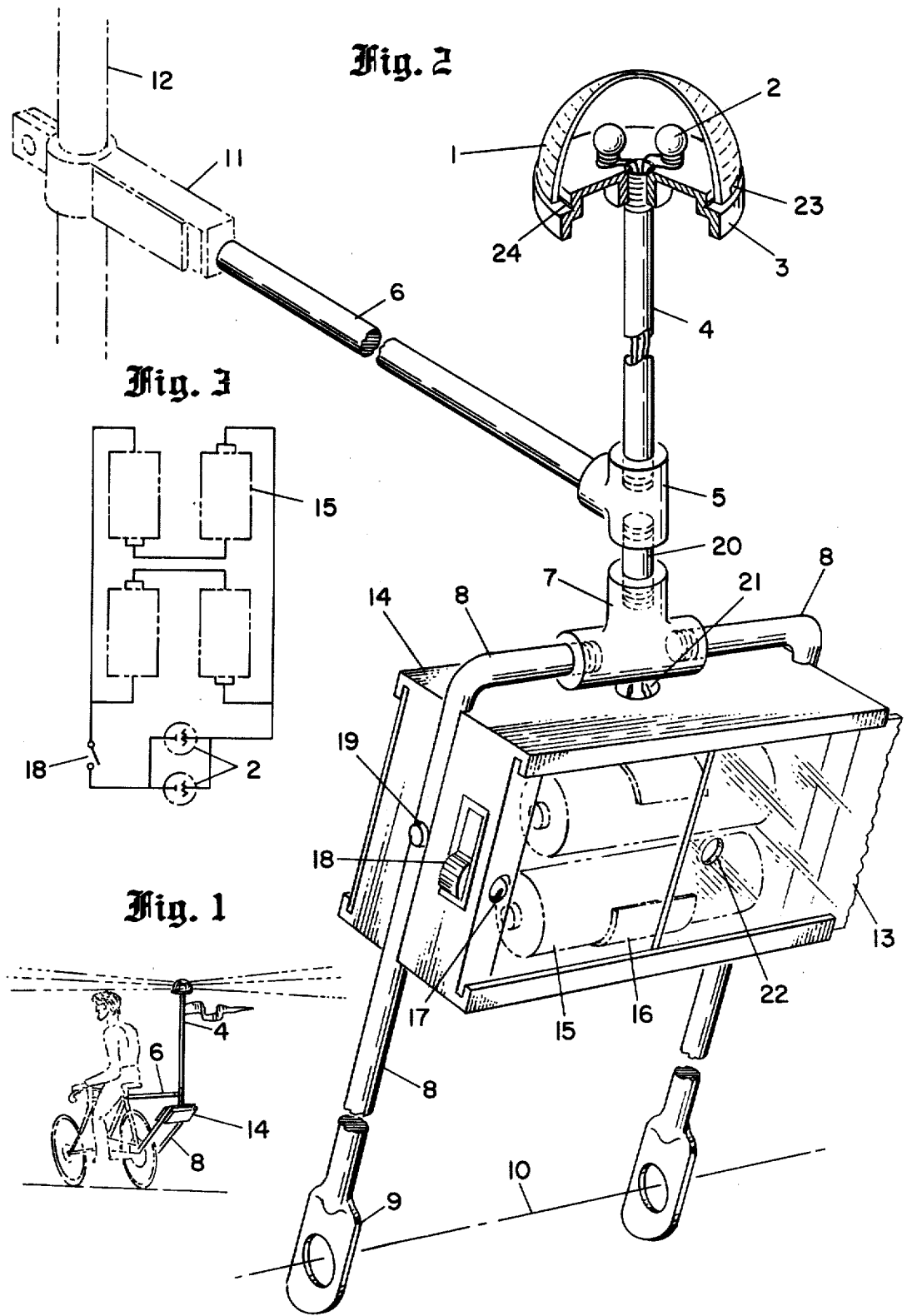

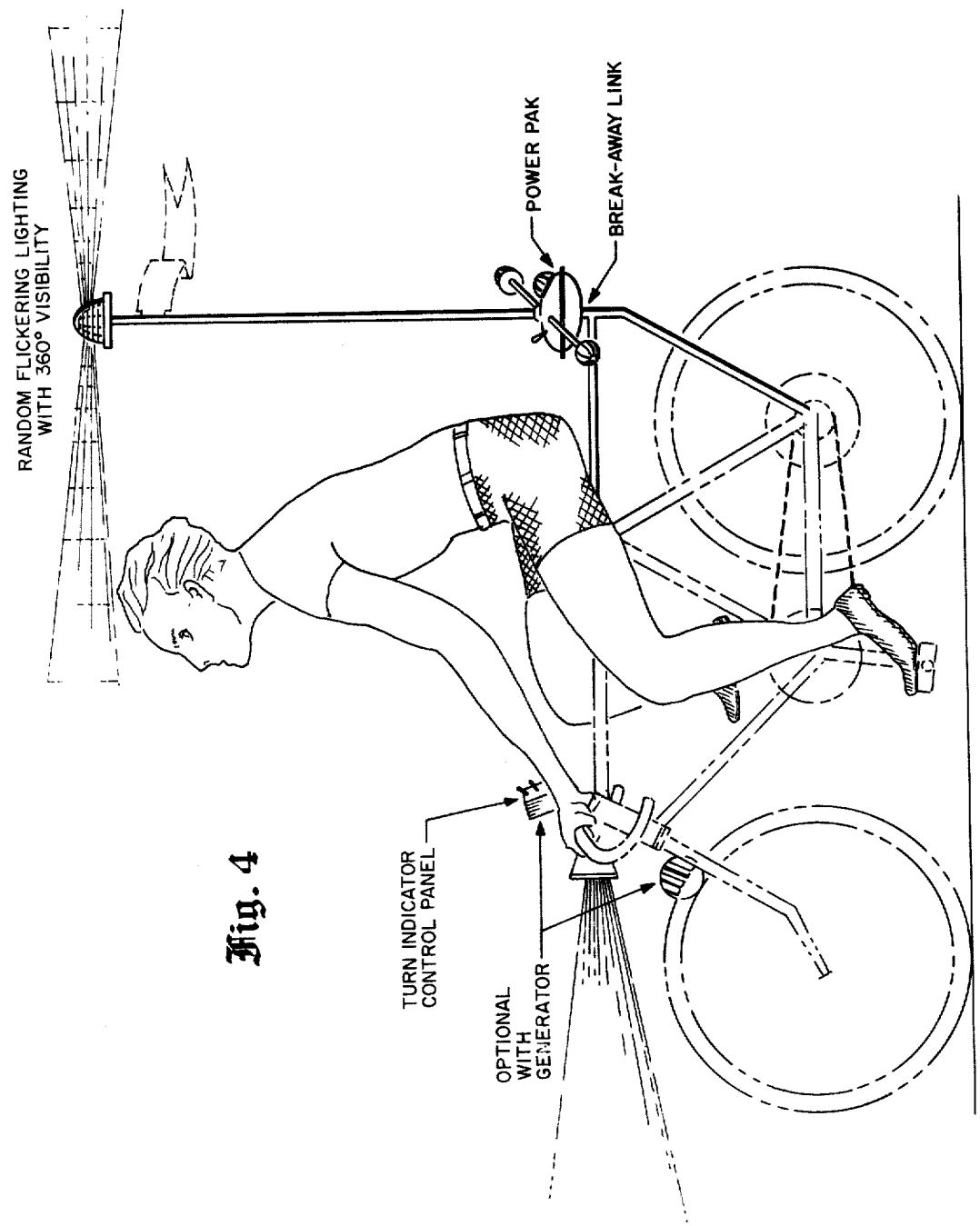

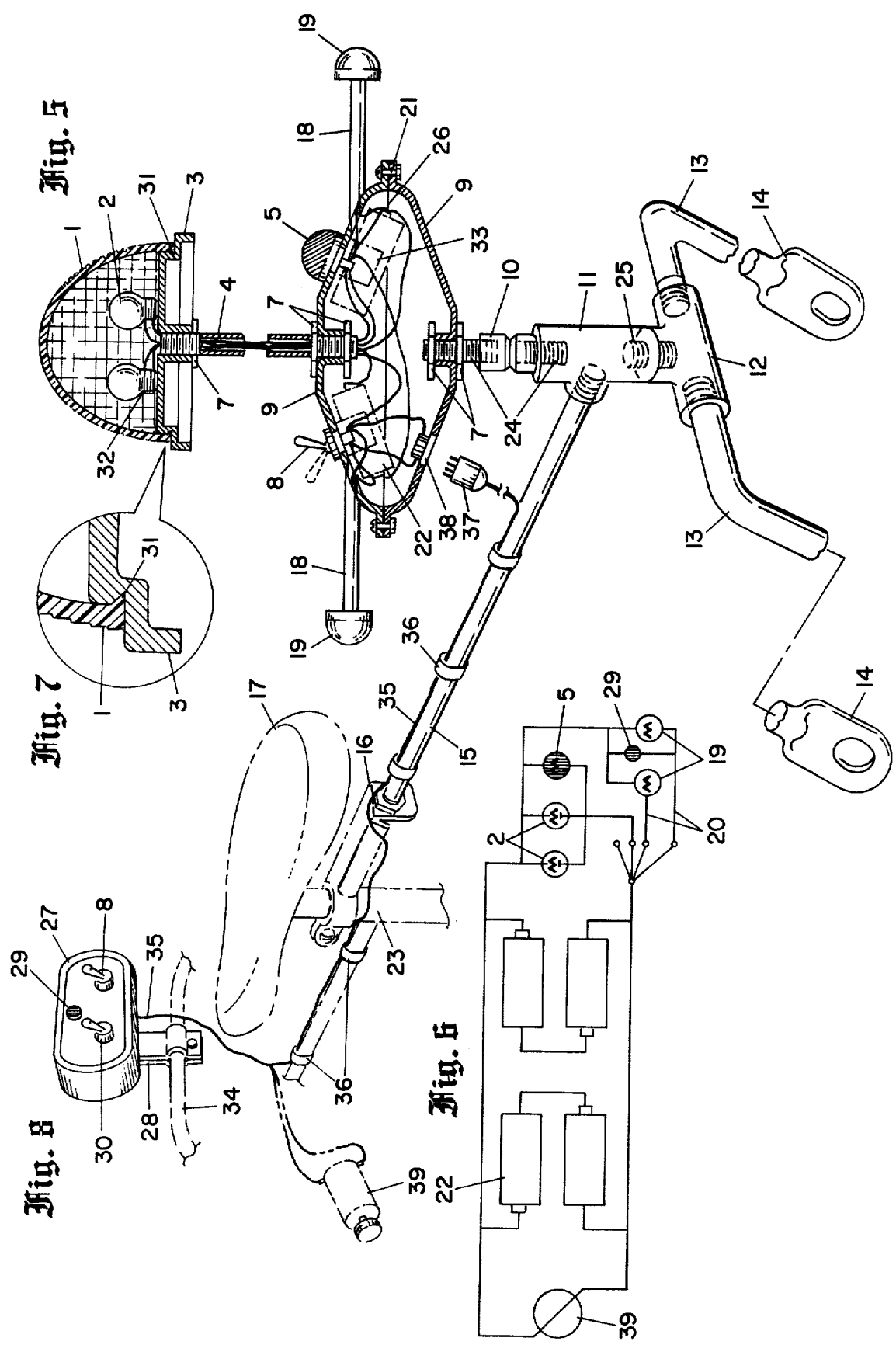

FLASHER

BACKGROUND AND PRIOR ART IN THIS PARTICULAR FIELD

1. Field of the Invention

This continuing application is a supplement to and an improvement on a method of mounting the power-pak battery housing on the original triangular bracing previously shown, and attached to the bicycle frame as well as adaptation to an existing bicycle rack if already in use.

The present invention relates to bicycles and other non-motor driven land-based vehicles and more particularly to moving warning lights which flicker in a random fashion above the head of the bicycle rider (at night reminding one of captured fireflies). In addition, as optional, or de-luxe equipment, a steady red tail light and directional signal lights which are operated from a mini-panel on the front handle bars are now included.

There have been many attempts at solving the problem of poor visibility of the motorist endangering the night riding bicyclist. Reflectors of various types have been used. Some have been attached to various parts of the bicycle, and some on the legs of the bicyclist. Generator driven headlights have been affixed to the bicycle. These all work only within a limited angle of visibility. Outside that angle of visibility they cannot be seen by motorists or pedestrians. This invention provides 360° warning light visibility to alert motorists and pedestrians to the proximity of the night-riding bicyclist.

2. U.S. Pat. No. 3,862,410 deals with a steady or steady pulsating light on the end of a wand which is attached directly to the rear axle of the bicycle with the light switch located at the axle. U.S. Pat. No. 4,023,032 also deals with a rear axle mounted wand which is unsupported except at the axle, has its light switch located at the axle housing and provides a steady light. U.S. Pat. No. 3,916,377 deals with moto-driven vehicles, i.e. motorcycles. In another example, a transistorized circuit was used to flash a warning lamp. That circuit housing and switch were also located at the rear axle, and provided only for a steady pulsating light. U.S. Pat. No. 3,974,369 also shows the battery and switch housing mounted on the rear axle with a pulsating light dependent on a revolving wind vane. U.S. Pat. No. 3,369,334 deals with motorcycles.

This invention is distinctive over these patents in the method by which the light wand is supported, and in the method by which the appurtenances are supported by:

1. Providing a strong attachment to the bicycle frame by means of a triangular structure.

2. Raising the power pak battery housing above the rear wheel and making it waterproof so that the contents will not be subject to water and dirt. The patents listed do not seem to take this important need into account.

3. Making the assemblage, consisting of the light housing, wand and battery power pak housing and switch removable for daytime use of the bicycle.

4. Providing a break-away link, easily replaceable, beneath the battery housing power pak, so that the upper section will separate from the lower section in case of impact, thus avoiding injuring the rider.

5. Bypassing the use of a transistorized circuit and staying only with battery and/or generator power, eliminating the extra cost of replacement for the transistorized unit which could be damaged under the constant physical shocks transmitted to the bicycle when in use, as well as eliminating the possibility of water and dirt damage.

6. Placing the wand back far enough so as to provide clearance for mounting and dismounting when swinging a leg over to mount or dismount from the bicycle.

7. Providing left and right directional signal lights and rear tail light which can be activated by a switch with an indicator light, on a small panel mounted on the handle bars, since at night a hand signal cannot be seen by a motorist, should the rider of the bicycle desire to make a turn. In addition, it keeps both hands on the handlebars at all times, and thus reduces the chance of an accident when the bicycle rider would have to remove one hand to signal a turn, leaving only one hand to control steering, without the automatic signals.

8. The manner in which the lights are mounted above the head of the bicycle rider, plus the use of a fresnel-lensed, pale yellow plastic housing which enhances and makes more brilliant and visible the emitting lights.

9. The wand on which the lights are mounted becomes a practical and available pole for the attachment of a signal flag for daytime use.

10. Power for the light is supplied by standard "D" size batteries which are easily removed for replacement.

11. Additional power can be supplied by wiring a standard bicycle generator to the power pack.

12. The slight weight of the lamp housing on the semi-rigid wand allows the wand and housing to move from side to side, in addition to the internal random flickering of the bulbs and also acts as a "damper" to the sideways weaving of the bicycle when the rider is pumping up an incline.

In addition, the California Highway Patrol Regulations allow the use of flickering light on a bicycle, provided it is not red or blue. A flickering light is not allowed on a motorized vehicle for civilian use.

DESCRIPTION OF THE FIREFLY CONTINUING APPLICATION

This Continuing Application of my invention is not limited to the specific items of the figure drawings or their arrangement. They are indicative only of the principles involved. The continuing scope of the invention will be covered in the "Claims" section which follows the description.

There are a total of eight (8) figure drawings. FIGS. 1, 2, and 3 describe the figure drawings in the application dated for filing on Jan. 25, 1979 and submitted with the formal drawing figures on May 14, 1979. FIGS. 4, 5, 6, 7 and 8 describe the scope of the Continuing Application.

FIG. 4 is a side view of a bicycle rider showing an improved mounting of the power pak, wand and light housing with the addition of a break-away link, directional signals, tail light and control panel and generator. The generator can be added as an additional power source and is optional.

FIG. 5 shows a partial section view and perspective drawing combined as a continuing application to FIGS. 1, 2 and 3, showing an improved method of mounting over the same triangular arrangement, with optional rear light and directional signal lights.

FIG. 6 is the wiring diagram for FIG. 5.

FIG. 7 is an enlarged cross-section showing molded annular ring on lamp housing as it fits into groove in lamp housing base 3.

FIG. 8 shows the optional mini-control panel as a deluxe version.

In FIG. 5, starting from the pale yellow fresnel-lensed plastic lamp housing 1, threaded metal or fibreglas tube 4 is screwed into lamp housing base 3 and locked with locknut 7. Plastic lamp housing 1 snaps onto housing base 3, by means of annular molded ring 31 (refer to enlarged cross-section in FIG. 7) for easy removal of bulbs 2, which are mounted to lamp housing base 3 by means of miniature sockets 32. The other end of metal or fibreglas tube 4 is screwed into upper portion of power-pak battery housing 9, and locked in place with locknuts 7. Inside of upper portion of power-pak battery housing 9 are arranged four battery spring clips 33, and toggle switch 8 to provide power to bulbs 2. Lower portion of power pak housing 9 is assembled to upper portion of power-pak housing 9 by means of four screws 21, (or ring clamp) with a gasket 26 in between upper and lower portions of the power-pak battery housing 9. In upper portion of power-pak battery housing 9 is installed a red tail light 5 and left and right turn signals 19 on tubes 18 wired to socket 38, and to the batteries 22. A short threaded metal rod 24 is attached to lower housing 9 with locknuts 7. To the other end of the short threaded rod 24 is screwed a notched rod, internally threaded at each end 10, which acts as a break-away link. The other end of the notched rod 10 is screwed into metal "T" fitting 11 by means of another short threaded rod 24. One end of metal rod 15 is screwed into "T" fitting 11, of sufficient length for leg clearance for mounting on bicycle. The other end of metal rod 15 is screwed into a standard bicycle fitting 16 on mounted seat shaft 23 under seat 17. The other end of "T" fitting 11 is attached to "T" fitting 12 by means of a short length of threaded rod 25. Into each end of "T" fitting 12 is screwed a bent metal rod 13, at the other end of which are flattened sections with holes 14 to match the axle of the rear bicycle wheel. These are attached to each end of the axle and are held in place with proper locknuts. Mini-control panel 27 (see FIG. 8) is attached to front handle bars 34 with bracket 28. Switch 30 controls directional lights 19. Toggle switch 8 is parallel-wired with toggle switch 8 on power-pak battery housing 9 FIG. 5, allowing control from front mini-control panel for Firefly lights. Red indicator light 29 is slaved to flasher units 20 (see FIG. 6) controlling turn signals 19. Wiring 35 from mini-control panel 27 is held in place on bicycle frame by clips 36, and end of wire has a mini-male plug 37 which plugs into a socket 38 provided at lower portion of power pak battery housing 9. Optional bicycle generator 39 can be wired into the mini-control panel 27 circuit for added power when using turn signals, tail light, and head lamp.

What I claim is:

1. A bicycle light system for night safety riding comprising; a tubular wand; means for mounting said tubular wand to the back of a bicycle; a pair of lamps; a fresnel-lensed housing means for containing said pair of lamps, and for directing light from said lamps substantially horizontally; means mounted on said bicycle, including a waterproof housing for enclosing batteries and for powering said lamps; means for interrupting the light flow to each of said lamps to provide a random flashing output illumination.

2. A bicycle light system as described in claim 1 wherein said mounting means includes a replaceable break-away link means for permitting said wand to deflect from rider when impacted.

3. A bicycle light system as described in claim 1 and this including turn signals and a tail light mounted near the base of said wand; this system controllable from a mini-control panel box securely mounted between the front handle bars of said bicycle; said mini-control panel to consist of proper activating switches; adjacent to each switch is a light emitting diode (LED) slaved to each switch to indicate the rear lights are operating properly without the rider having to turn his head to visually check the functioning of the lamps, thus taking his eyes off the road while riding.

4. A bicycle light system as defined in claim 1 where said mounting means includes triangular bracing for mounting said wand above the rear wheel of said bicycle and to the rear of the rear axle of said bicycle.

* * * * *